US008693215B2

(12) United States Patent
Coley et al.

(10) Patent No.: US 8,693,215 B2
(45) Date of Patent: Apr. 8, 2014

(54) DC/DC CONVERTER WITH MAGNETIC FLUX DENSITY LIMITS

(75) Inventors: William Hall Coley, Cary, NC (US); Charles Edward Hawkes, Cary, NC (US); Kurk David Mathews, Menlo Park, CA (US)

(73) Assignee: Linear Technology Corporation, Milpitas, CA (US)

( * ) Notice: Subject to any disclaimer, the term of this patent is extended or adjusted under 35 U.S.C. 154(b) by 287 days.

(21) Appl. No.: 13/151,689

(22) Filed: Jun. 2, 2011

(65) Prior Publication Data
US 2011/0299304 A1    Dec. 8, 2011

Related U.S. Application Data

(60) Provisional application No. 61/351,685, filed on Jun. 4, 2010.

(51) Int. Cl.
 *H02M 3/335*    (2006.01)
(52) U.S. Cl.
 USPC ................................ 363/21.04; 363/21.09
(58) Field of Classification Search
 USPC ................................ 363/21.04, 21.09, 50
 See application file for complete search history.

(56) References Cited

U.S. PATENT DOCUMENTS

| | | | |
|---|---|---|---|
| 4,195,333 A * | 3/1980 | Hedel | 363/21.07 |
| 4,439,822 A | 3/1984 | Cocconi | |
| 4,700,280 A * | 10/1987 | Onda et al. | 363/19 |
| 4,809,148 A | 2/1989 | Barn | |
| 5,394,319 A * | 2/1995 | Attwood et al. | 363/20 |
| 5,659,460 A * | 8/1997 | Vinciarelli | 363/21.03 |

(Continued)

FOREIGN PATENT DOCUMENTS

| | | |
|---|---|---|
| DE | 19524963 A1 | 1/1997 |
| EP | 2393190 A2 | 12/2011 |
| TW | 201021390 A | 6/2010 |

OTHER PUBLICATIONS

Extended European Search Report, dated Jan. 7, 2013, European Patent Application 11004553.1 (published Dec. 7, 2011, as EP 2393190 A2), entitled "DC/DC Converter with Magnetic Flux Density Limits."

(Continued)

*Primary Examiner* — Adolf Berhane
*Assistant Examiner* — Emily P Pham
(74) *Attorney, Agent, or Firm* — McDermott Will & Emery LLP

(57) ABSTRACT

A DC/DC converter may include a power stage circuit, a pulse generator circuit, a flux density monitor, and power control logic. The power stage circuit includes an input, an output, and a transformer with a core. The power stage circuit may be configured to operate in a power transfer phase during which power is transferred from the input to the output and a reset phase during which flux density in the core of the transformer is reduced. The pulse generator circuit may be configured to generate pulses that regulate the output of the power stage circuit. The flux density monitor circuit may be configured to generate flux density information indicative of the flux density of the core of the transformer during both the power transfer phase and the reset phase. The power stage control logic may be configured to regulate the output of the power stage circuit based on the pulses and to prevent the core of the transformer from saturating based on the flux density information.

21 Claims, 5 Drawing Sheets

(56) References Cited

U.S. PATENT DOCUMENTS

| | | |
|---|---|---|
| 5,940,281 A | 8/1999 | Wolf |
| 6,292,376 B1* | 9/2001 | Kato .......................... 363/21.09 |
| 2002/0131277 A1* | 9/2002 | Takegami ...................... 363/20 |
| 2003/0039128 A1 | 2/2003 | Cohen |
| 2006/0209571 A1* | 9/2006 | Aso et al. ................... 363/21.01 |

OTHER PUBLICATIONS

Official Letter of Pending Patent Application (translation), dated Aug. 5, 2013, for corresponding Taiwanese Patent Application 100119607 entitled "DC/DC Converter with Magnetic Flux Density Limits."

\* cited by examiner

DC/DC CONVERTER WITH MAGNETIC FLUX DENSITY LIMITS

CROSS-REFERENCE TO RELATED APPLICATION

This application is based upon and claims priority to U.S. provisional patent application 61/351,685, entitled "DC/DC CONVERTER MAGNETIZING CURRENT LIMIT," filed Jun. 4, 2010. The entire content of this application is incorporated herein by reference.

BACKGROUND

1. Technical Field

This disclosure relates to DC/DC converters and to saturation of transformers used therein.

2. Description of Related Art

DC/DC converters are widely used to step from an input voltage to an output voltage that may be higher or lower than the input voltage. Some DC/DC converters employ a transformer to step the input voltage up or down and/or provide galvanic isolation between the input supply and the output supply (i.e. isolated converters).

When a voltage is applied to a primary transformer winding, the magnetic field in the transformer core creates a voltage on the secondary transformer winding that is proportional to the turns ratio of the transformer. The turns ratio is the ratio of the number of turns on the primary winding (NP) to the number of turns on the secondary winding (NS). The voltage on the secondary side of the transformer is therefore $V_{SEC}=V_{PRI}*NS/NP$. The relationship between the current that is demanded by the secondary side and the current supplied by the primary side of the transformer is inversely proportional to the turns ratio, such that $I_{SEC}=I_{PRI}*NP/NS$.

An additional "magnetizing current" is required to magnetize the core of the transformer. This magnetizing current flows on the primary side of the transformer, but not on the secondary side of the transformer.

The magnetizing current relationship to voltage is inductive. In other words, when voltage is applied to the primary winding of the transformer, the magnetizing current increases linearly as the magnetic flux density ("flux density") accumulates inside the core. With continued positive bias across the primary winding, the transformer will saturate, causing the transformer windings to appear as a short circuit. At this time, the magnetizing current increases very rapidly and is limited only by a small amount of leakage inductance, which is generally 100-1000 times less than the magnetizing inductance. This rapid increase in current can be catastrophic for a DC/DC converter and may destroy components.

To avoid saturation, the flux density in a DC/DC converter can be reduced through an operation referred to as "resetting" the core. These DC/DC converters typically cycle between a power transfer phase during which power is transferred from the input to the output of the converter and a reset phase during which the flux density that increased during the power transfer phase is reduced.

Reducing the flux density is typically accomplished by reversing the voltage on the primary winding. Some DC/DC converters use what is known as an "active clamp reset." The reversing voltage is applied until the flux density not only drops to zero, but then increases in the opposite direction. If allowed to increase too much in the opposite direction, however, the core of the transformer can also saturate during the reset phase.

Various approaches have been taken to switch between the power transfer phase and the reset phase without causing saturation.

Some converters use a primary side current comparator. These converters compare the transformer current on the primary side during the power transfer phase with a threshold. When the threshold is exceeded, they shut off a primary side switch that controllably connects the input of the converter to a supply source. However, the comparators that are used may not be fast enough to protect the switch or other components from damage in the event of the rapid increase in current due to transformer saturation. Also, these types of converters do not protect the circuit from saturation during the reset phase.

Some converters slow down the rate at which increases in current are permitted, making fast detection of saturation less important. However, this slow down reduces the ability of the converter to quickly compensate for rapid changes in the source or load, weakening its ability to provide tight regulation. This approach may also fail to avoid saturation, such as when the input voltage rapidly ramps to its minimum value.

Some converters limit the maximum duty cycle of the power switch that controls the length of time the input of the converter is connect to the supply source during the power transfer phase, as transformer saturation is often a greater problem at high duty cycles, when the on-time is long. This approach, however, does not prevent negative flux saturation during the reset phase. It may also fail to prevent transformer saturation during lower duty cycles of the power transfer phase, such as when the converter is started up with its output initially pre-biased at its normal operating level.

SUMMARY

A DC/DC converter may include a power stage circuit, a pulse generator circuit, a flux density monitor, and power control logic. The power stage circuit may include an input, an output, and a transformer with a core. The power stage circuit may be configured to operate in a power transfer phase during which power is transferred from the input to the output and a reset phase during which flux density in the core of the transformer is reduced. The pulse generator circuit may be configured to generate pulses that regulate the output of the power stage circuit. The flux density monitor circuit may be configured to generate flux density information indicative of the flux density of the core of the transformer during both the power transfer phase and the reset phase. The power stage control logic may be configured to regulate the output of the power stage circuit based on the pulses and to prevent the core of the transformer from saturating based on the flux density information.

The power stage control logic may be configured to prevent the core from saturating during the power transfer phase by causing the power transfer phase to terminate when the flux density information indicates that the flux density has reached or exceeded a pre-determined threshold.

The power stage control logic may be configured to prevent the core from saturating during the flux reset phase by causing the flux reset phase to terminate when the flux density information indicates that the flux density has reached or exceeded a pre-determined threshold.

The DC/DC converter may be a forward converter.

The pulse generator may be configured to generate a maximum duty cycle pulse that terminates the power transfer phase when the duty cycle of the power transfer phase reaches or exceeds a pre-determined threshold.

The pulse generator may be configured to terminate the power transfer phase when current in the output of the power stage circuit reaches or exceeds a pre-determined amount.

The pulses generated by the pulse generator circuit may have a constant frequency.

The power stage circuit may be configured to provide an active clamp reset. The active clamp reset may cause the flux density to reverse in polarity during the reset phase.

The power stage circuit may be configured to provide a resonant reset.

The power stage circuit may include switches on a secondary side of the transformer that function as diodes.

The flux density monitor circuit may include a capacitance and may be configured to cause a voltage across the capacitance to track changes in the flux density of the core of the transformer during the power transfer and/or the reset phase.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
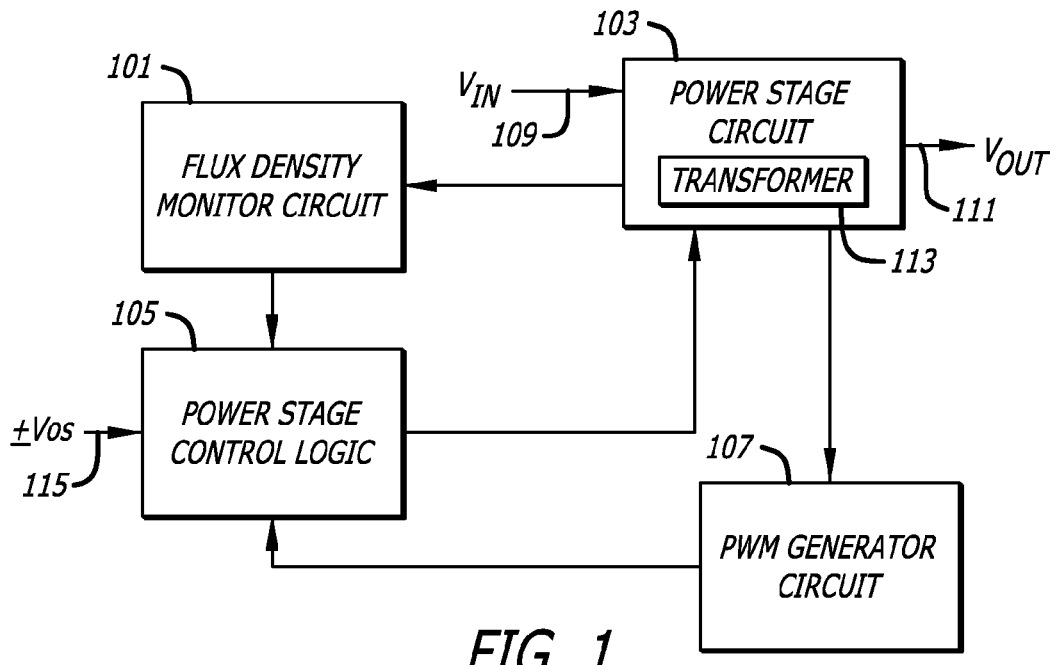
FIG. 1 is a block diagram of a DC/DC converter that prevents saturation in the core of a transformer that is part of the converter.

FIG. 1 is a block diagram of a DC/DC converter that prevents saturation in the core of a transformer that is part of the converter. As illustrated in FIG. 1, the DC/DC converter may have a flux density monitor circuit 101, a power stage circuit 103, power stage control logic 105, and a PWM generator circuit 107.

The power stage circuit may include an input 109 configured to be connected to a supply source, such as V.sub.IN. The power stage circuit 103 may include an output 111 configured to deliver a constant voltage output, such as V.sub.OUT. The power stage circuit 103 may include a transformer 113 that has a core. The power stage circuit 103 may be configured to operate in a power transfer phase during which power is transferred from the input 109 to the output 111. The power stage circuit 103 may also be configured to operate in a reset phase during which flux density in the core of the transformer 113 is reduced.

The PWM generator circuit 107 may be configured to generate pulses with a modulated width that regulate the output 111 of the power stage circuit 103. Larger pulse widths may cause more power to be transferred, while smaller pulse width may cause less power to be transferred.

The flux density monitor circuit 101 is configured to generate flux density information indicative of the flux density in the core of the transformer 113 during both the power transfer phase and the reset phase.

The power stage control logic 105 is configured to regulate the output 111 of the power stage circuit 103 based on the pulses from the PWM generator circuit 107. The power stage control logic 105 is also configured to prevent the core of the transformer 113 from saturating based on the flux density information from the flux density monitor circuit 101. The power stage control logic 105 may be configured to prevent the core from saturating during the power transfer phase by causing the power transfer phase to terminate when the flux density information indicates that the flux density has reached or exceeded a pre-determined threshold. Similarly, the power stage control logic may be configured to prevent the core from saturating during the flux reset phase by causing the flux reset phase to terminate when the flux density information indicates that the flux density has reached or exceeded a pre-determined threshold. These pre-determined thresholds are indicated in FIG. 1 as +/−$V_{OS}$ 115. Although indicated as being of the same magnitude, the positive and negative thresholds may be different.

Figure 2:
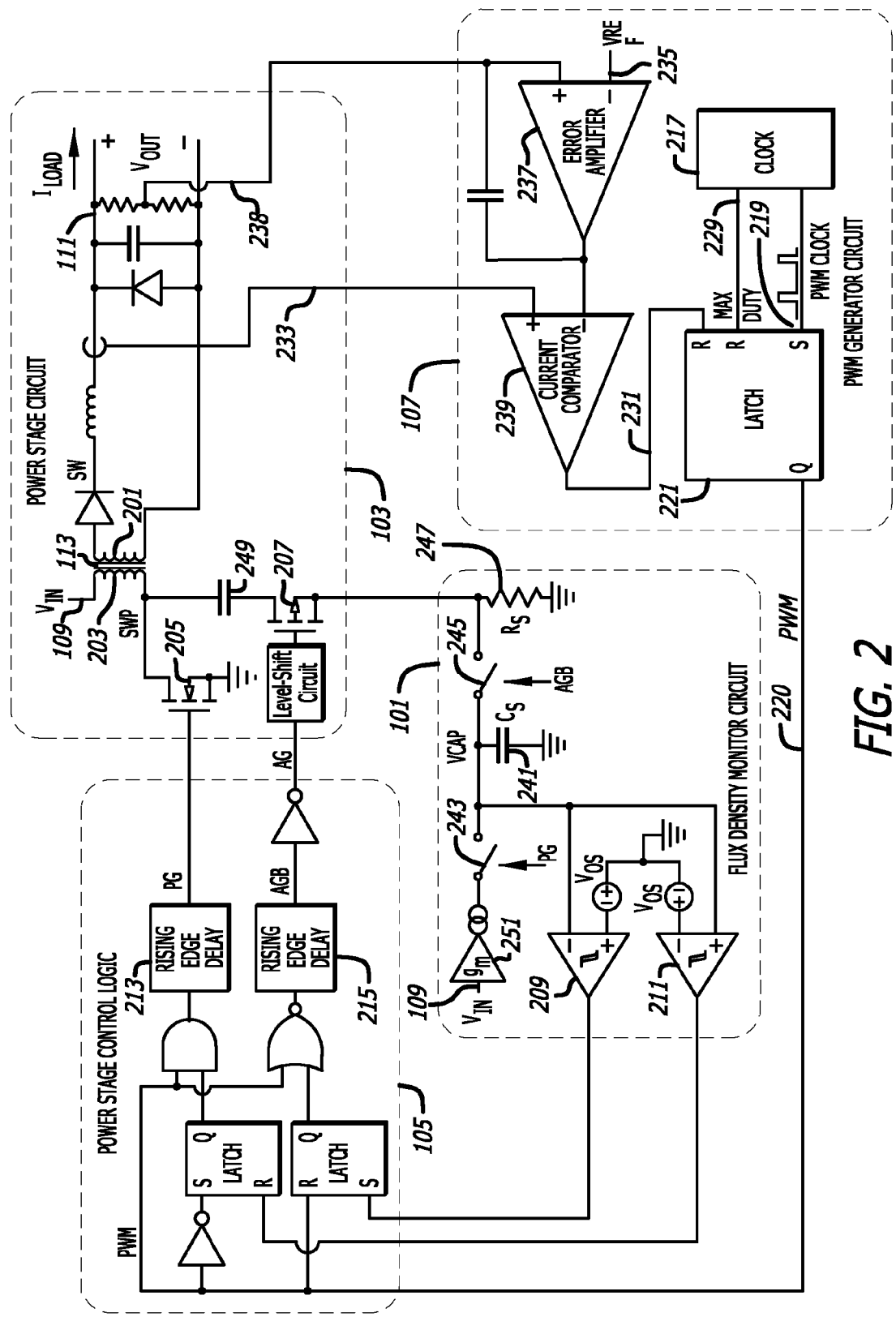
FIG. 2 illustrates an example of components that may be used to implement the DC/DC converter illustrated in FIG. 1 and that provide an active clamp reset.

FIG. 2 illustrates an example of components that may be used to implement the DC/DC converter illustrated in FIG. 1 and that provide an active clamp reset. As illustrated in FIG. 2, a secondary winding 201 of the transformer 113 may be connected to a rectification and filtering system. Current through a primary winding 203 may be controlled by a MOSFET 205 which, when closed, may cause the power stage circuit 103 to be in the power transfer phase. Current through the primary winding 203 is also controlled by a MOSFET 207 which, when closed, causes the power stage circuit 103 to be in the reset phase.

The power stage control logic 105 may be configured to ensure that the MOSFETs 205 and 207 are never both closed at the same time. Rising edge delays 213 and 215 may be included to facilitate this protection.

The PWM generator circuit 107 may be configured to generate a PWM signal 220 that is used by the power stage control logic 105, along with signals from the flux density monitor circuit 101, to control the states of the MOSFETs 205 and 207. As will be discussed below in more detail, the flux density monitor circuit 101 may include comparators 209 and 211, the outputs of both of which may be low when the flux density in the core of the transformer 113 is not close to saturation. During this normal phase of operation, the power stage control logic 105 may be configured to cause the MOSFET 205 to close and the MOSFET 207 to open upon a rising edge of the PWM signal 220, thus initiating the power transfer phase of the power stage circuit 103. Conversely, and also during normal operation, the power stage control logic 105 may be configured to cause the falling edge of the PWM signal 220 to open MOSFET 205 and close MOSFET 207, thus placing the power stage circuit 103 in the reset phase.

The PWM generator circuit 107 may be configured to cause the PWM signal 220 to rise on a periodic basis. To facilitate this, a clock 217 in the PWM generator circuit 107 may generate a PWM clock signal 219 which may set a latch 221. The PWM clock signal 219 may be periodic, thus causing its rising edge to rise periodically.

As illustrated in FIG. 2, the latch 221 may have two reset inputs, thus causing the PWM signal 220 to fall upon the first of two reset input signals.

One of these reset input signals may be a maximum duty cycle signal 229. This may be another periodic signal that is generated by the clock 217. The maximum duty cycle signal 229 may have the same period as the PWM clock 219. However, its rising edge may be delayed by the clock 217 in an amount that corresponds to a maximum desired duty cycle for the power transfer phase. For example, the clock 217 may be configured to cause the maximum duty cycle signal 219 to rise 80% of the way into the duty cycle of the PWM clock signal 219. This reset input to the latch 221 ensures that the power transfer phase will not exceed a pre-determined percentage of the duty cycle of the PWM signal 220, such as 80%. This percentage may be selected to ensure that the core of the transformer 113 does not saturate during the power transfer phase during normal operating conditions. Notwithstanding, this protective feature may not be sufficient to ensure that the core of the transformer 113 also does not saturate during extreme operating conditions. The flux density monitor circuit 101 may be configured to assist in preventing core saturation during extreme operating conditions, as described in more detail below.

The other reset input to the latch 221 may be a reset signal 231 which causes the PWM signal 220 to fall when the sensed inductor current 233 of the power stage circuit 103 reaches a peak current threshold dictated by error amplifier 237. Error amplifier 237 integrates the difference between a reference voltage input 235 and a scaled value 238 of $V_{OUT}$ to regulate the output voltage 111 by increasing or decreasing the current supplied to the output through the inductor. When the scaled value 238 of $V_{OUT}$ is less than reference 235, the output of error amplifier 237 increases, causing the current comparator 239 threshold to increase. Similarly, when the scaled value 238 of $V_{OUT}$ is greater than reference 235, the output of error amplifier 237 decreases, causing the current comparator 239 threshold to decrease. When the desired peak inductor current is reached, the output of the current comparator 239 goes high, resetting the latch 221 and causing the PWM signal 220 to fall, thus initiating the reset phase under normal operating conditions.

As indicated above, the flux density monitor circuit 101 is configured to monitor the flux density in the core of the transformer 113. As will become clear from the following discussion, the voltage across a capacitance 241 may be indicative of this flux density.

During the reset phase, a signal AG from the output of the power stage control logic 105 may be high and a signal PG may be low. This may cause the MOSFET 205 to be open, the MOSFET 207 to be closed, an electronic switch 243 to be open, and an electronic switch 245 to be closed. During this reset phase, flux density from the core of the transformer 113, may be reduced as current flows through a resistance 247 designated in the drawing as $R_S$. Because of the presence of the diode in the power stage circuit 103, the only current flowing through the resistance $R_S$ may be the magnetizing current that is representative of the flux density in the core of the transformer 113. Thus, the voltage across the capacitance 241 may be representative of the flux density in the core of the transformer 113 during the reset phase.

The configuration of components that are involved in the reset phase illustrated in FIG. 2 provide what is known as an active clamp reset. The voltage across a capacitance 249 is higher than $V_{IN}$. After the reset phase is initiated by the closure of the MOSFET 207, the voltage across capacitance 249 is imposed on node SWP, which places a negative bias across the transformer. This causes the flux density in the core of the transformer 114 to decrease. The capacitance 249 may store enough charge to not only decrease the flux density to zero, but to begin to reverse in direction. If the reset phase continues for a long enough time, the magnitude of the flux density in the reverse direction may continue to grow until it saturates the core of the transformer 113 during the reset phase.

To prevent this, the voltage across the capacitance 241 may be monitored during the reset phase by the comparator 209. When it exceeds a pre-determined threshold $V_{OS}$, the output of the comparator 209 goes high, causing AGB to go low, which turns off P-Channel MOSFET 207, thus terminating the reset phase. This functionality may ensure that the core of the transformer 113 does not saturate during an active clamp reset.

AGB may remain low until the next power transfer phase begins. While AGB is low, the electronic switch 245 may be open. During this period when both of the electronic switches 243 and 245 are open, the voltage across the capacitance 241 is preserved, thus continuing to cause the voltage across the capacitance 241 to be representative of the flux density in the core of the transformer 113.

When the next power transfer phase begins, PG may go high, thus closing the MOSFET 205 and the electronic switch 243. This may cause the current output of a transconductance amplifier 251 to be delivered into the capacitance 241. The input of the transconductance amplifier 251 may be connected to $V_{IN}$, i.e., the voltage across the primary winding 203 of the transformer 113 during the power transfer phase.

The gain of the transconductance amplifier 251 may be selected so as to cause changes in the voltage across the capacitance 241 to track changes in the flux density in the core of the transformer 113 during the power transfer phase. The magnetization current that tracks the flux density in the core of the transformer 113 may be assumed to increase linearly with time. Based on this assumption, the magnetization current $I_{MAG}$ has a slope equal to:

$$\frac{dI_{MAG}}{dt} = \frac{V_{IN}}{L_{MAG}} \tag{1}$$

where $V_{IN}$ is the input voltage and $L_{MAG}$ is the magnetizing inductance of the transformer. The gain of the transconductance amplifier 251 may thus be determined by setting the slope of the capacitance voltage equal to the slope of the magnetizing current multiplied by the sense resistance $R_S$ and then solving for $g_M$. Specifically:

$$\frac{dV_C}{dt} = \frac{dI_{MAG}}{dt} R_S \quad (3)$$

$$\frac{g_m V_{IN}}{C_S} = \frac{V_{IN}}{L_{MAG}} R_S \quad (4)$$

$$g_m = \frac{C_S R_S}{L_{MAG}} \quad (5)$$

Since the initial voltage across the capacitance 241 during the power transfer phase may be equal to the last stored value of $I_{MAG} \times R_S$, the voltage on the capacitance 241 at any given time is an accurate approximation of the magnetization current multiplied by the sense resistance.

The comparator 211 may be configured to compare the voltage across the capacitance 241 and thus the flux density that it represents with a positive pre-determined threshold $V_{OS}$. When the voltage exceeds this threshold, the output of the comparator 211 goes high, causing the MOSFET 205 to be opened and, accordingly, termination of the power transfer phase.

The voltage across the capacitance 241 may also be compared to a negative pre-determined threshold $-V_{OS}$ by the comparator 209. When the voltage across the capacitance 241 becomes more negative than this negative pre-determined threshold, the output of the comparator 209 goes high, thus causing the MOSFET 207 to open and, accordingly, terminating the reset phase.

In other words, the flux density monitor circuit 101 may function as a safeguard that ensures that the core of the transformer 113 does not saturate, either during the power transfer phase or during the reset phase.

As indicated above, the transconductance amplifier gain may be dependent on application circuit parameters, and thus may be user-programmable. One embodiment to the transconductance amplifier may regulate a pin of the IC to a voltage linearly proportional to $V_{IN}$. The user may then place a resistor proportional to $L_{MAG}$ divided by $(R_S * C_S)$ to ground on the pin. The current source by the pin may then be used to charge the capacitance 241, which may be a fixed internal value or an adjustable external component.

Another variation may be to replace the transconductance amplifier with a circuit that computes the required on-time charging current based on the measured peak and valley on the voltage sense on the resistance 247 in the on time of the PWM signal 220. This variation may not require the user to add a resistor or other component proportional to circuit parameters, other than the magnetizing current sense resistance 247.

The circuitry illustrated in FIG. 2 thus prevents saturation of the core in the transformer 113 in an active clamp forward converter. The flux density may be directly measured and limited during the reset phase. During the power transfer phase, the flux density may be estimated based on the last known direct measurement of the magnetizing current and a user-programmable gain. As indicated, the flux density may be limited to prevent both positive and negative saturation, all of which may take place with minimal degradation in transient response time.

Figure 3:
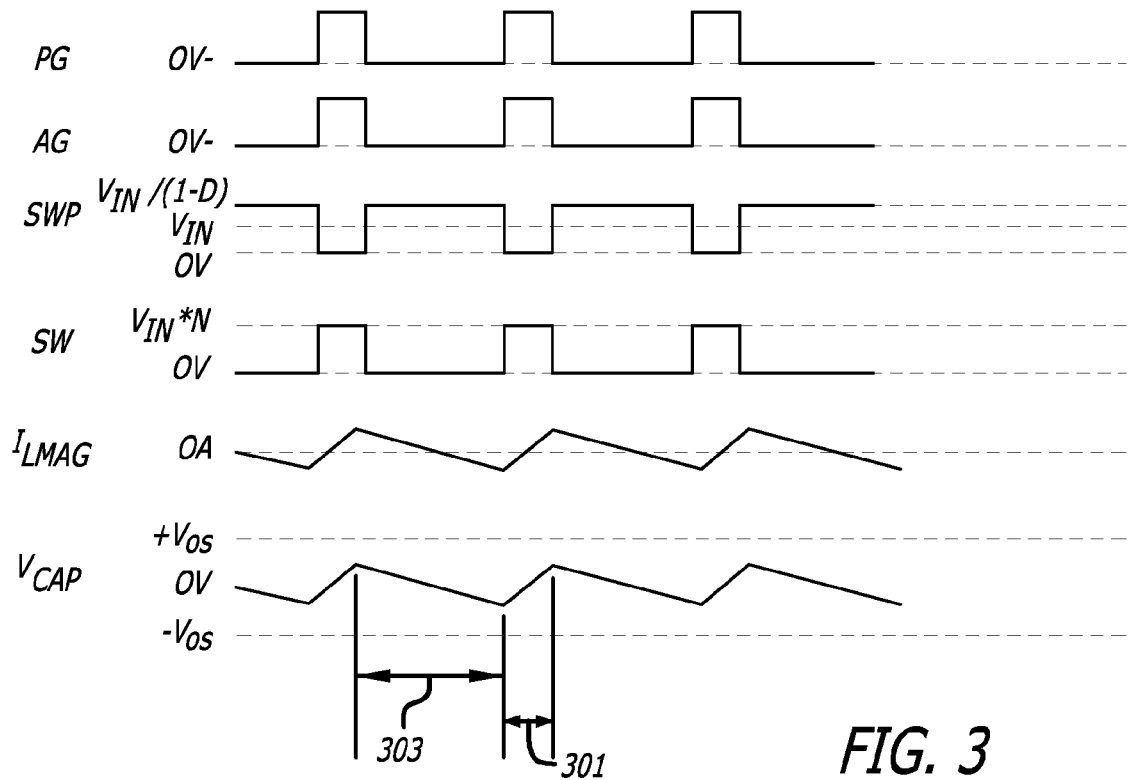
FIG. 3 illustrates an example of signals that may be present in the DC/DC converter illustrated in FIG. 2 under normal operating conditions.

FIG. 3 illustrates an example of signals that may be present in the DC/DC converter illustrated in FIG. 2 under normal operating conditions. The name of each signal illustrated in FIG. 3 may also be found next to a signal-carrying line in FIG. 2.

As illustrated in FIG. 3, the voltage $V_{CAP}$ across the capacitance 241 may closely track the magnetization current $I_{LMAG}$ and thus the flux density in the core of the transformer 113. In FIG. 3, the voltage $V_{CAP}$ across the capacitance 241 never reaches the positive pre-determined threshold $+V_{OS}$ during the power transfer phase or the negative pre-determined threshold $-V_{OS}$ during the reset phase. Thus, the flux density is illustrated as never approaching saturation. This represents a normal operating condition. During this normal operation, the outputs of the comparators 209 and 211 may never go high, causing the timing of a power transfer phase 301 and a reset phase 303 to both be governed by the rising and falling edges of the PWM signal 220, respectively. As indicated above, moreover, the capacitance 241 may be directly connected across the sense resistance 247 during the reset phase 303, while it may be charged at a rate which is substantially identical to the rate of changes in the flux density during the power transfer phase 301.

Figure 4:
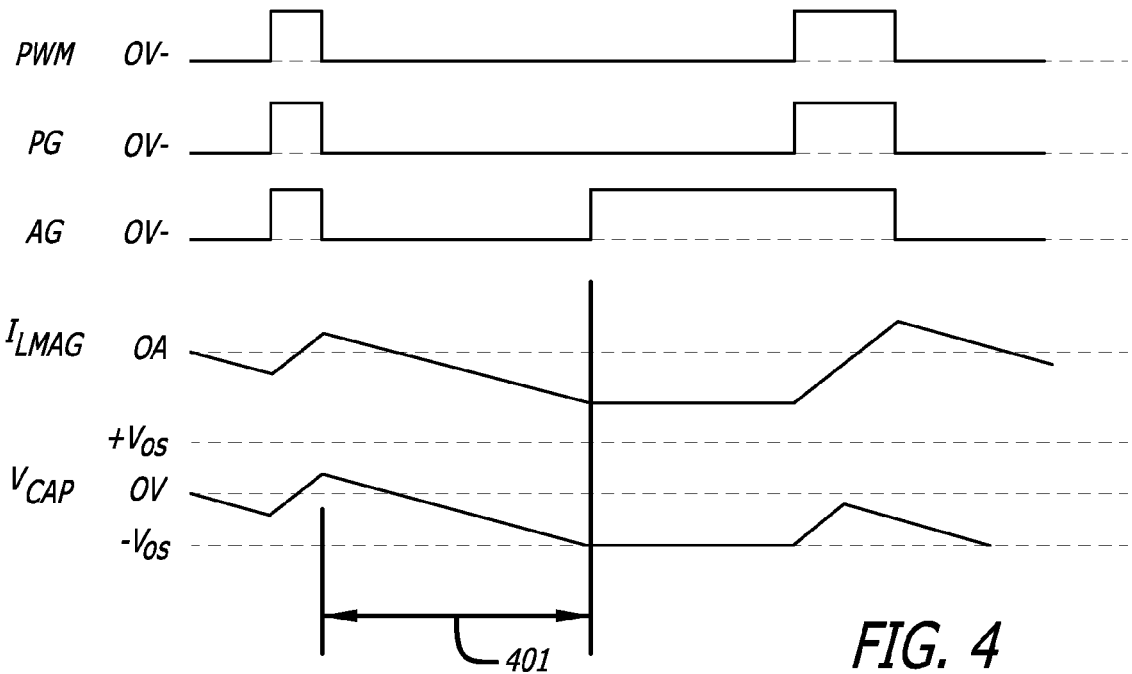
FIG. 4 illustrates an example of signals that may be present in the DC/DC converter illustrated in FIG. 2 under an extreme operating condition that causes the flux density to reach a limit during a reset phase of the converter.

FIG. 4 illustrates an example of signals that may be present in the DC/DC converter illustrated in FIG. 2 under an extreme operating condition that causes the flux density to reach a limit during a reset phase of the converter. As illustrated in FIG. 4, the voltage $V_{CAP}$ across the capacitance 241 may reach the negative pre-determined threshold $-V_{OS}$ during a reset phase 401. This may cause the output of the comparator 209 to go high, terminating the reset phase (designated by AG in FIG. 4) prematurely, i.e., before the next rising edge of the PWM signal 220. Without this protection, the core might have saturated.

Figure 5:
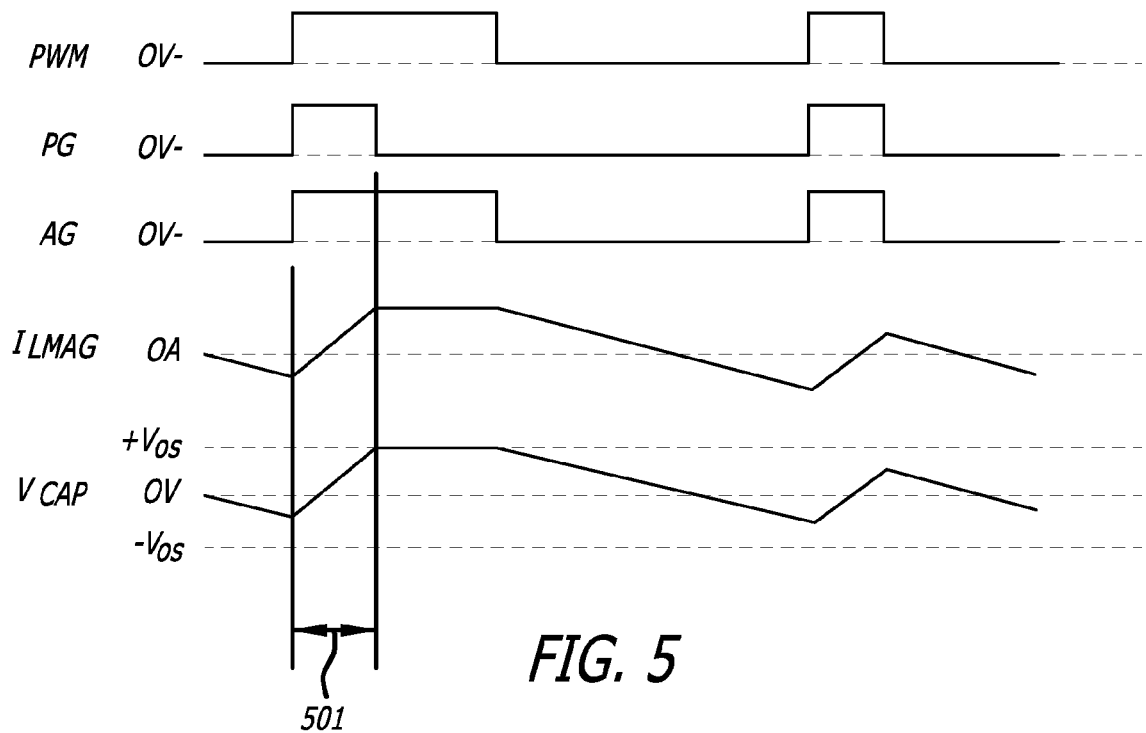
FIG. 5 illustrates an example of signals that may be present in the DC/DC converter illustrated in FIG. 2 under an extreme operating condition that causes the flux density to reach a limit during a power transfer phase of the converter.

FIG. 5 illustrates an example of signals that may be present in the DC/DC converter illustrated in FIG. 2 under an extreme operating condition that causes the flux density to reach a limit during a power transfer phase of the converter. As illustrated in FIG. 5, the voltage $V_{CAP}$ across the capacitance 241 may reach the positive pre-determined threshold $+V_{OS}$ during a power transfer phase 501. This may cause the output of the comparator 211 to go high, thus terminating the power transfer phase (indicated by PG) prior to the next falling edge of the PWM signal 220. Without this protection, the core may have again saturated, this time notwithstanding the peak current and maximum duty cycle protections provided by the PWM generator circuit 107, as discussed above.

Figure 6:
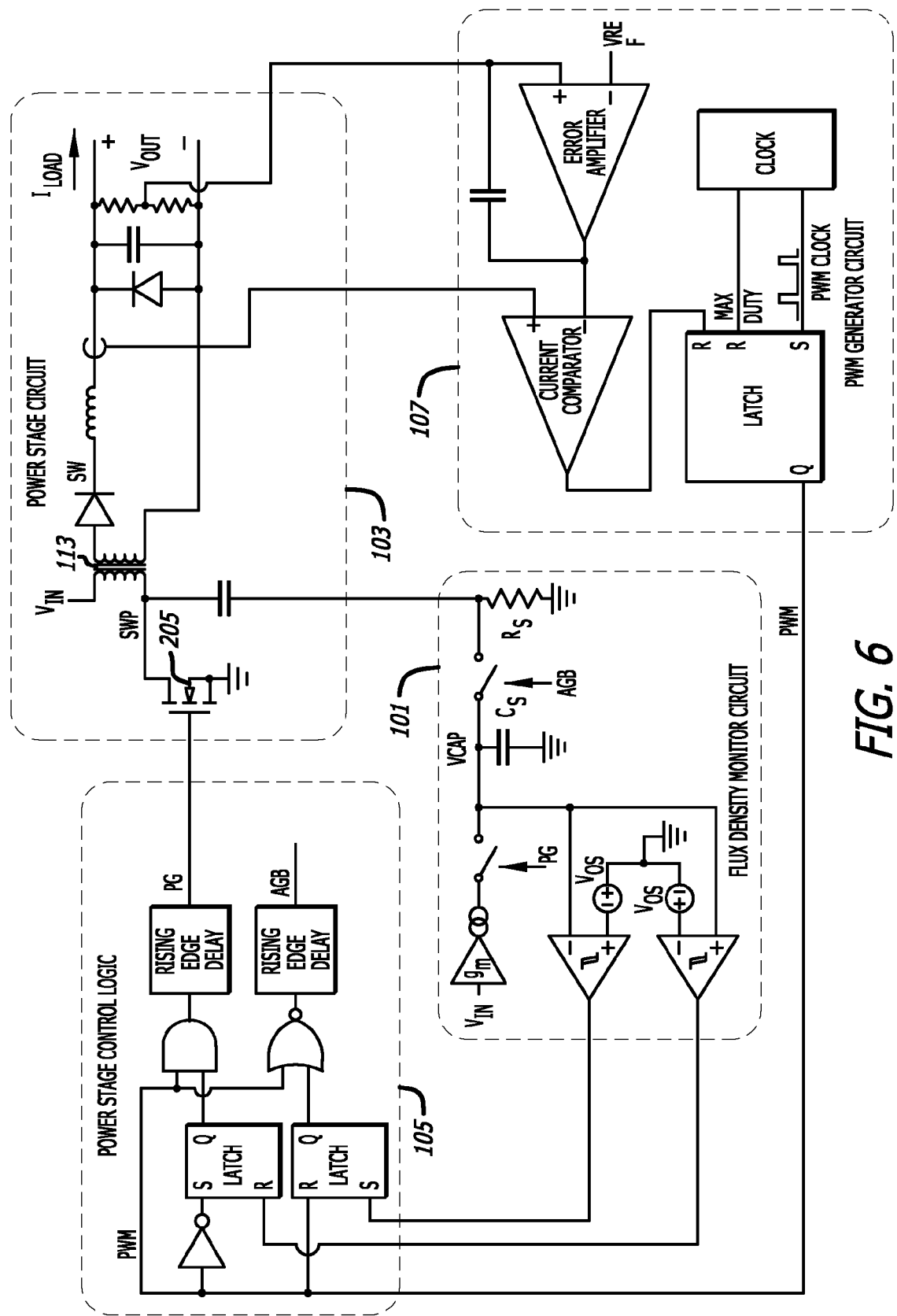
FIG. 6 illustrates an alternate embodiment of the circuit illustrated in FIG. 2 that provides a resonant reset rather than an active clamp reset.

FIG. 6 illustrates an alternate embodiment of the circuit illustrated in FIG. 2 that provides a resonant reset, rather than an active clamp reset. The circuit illustrated in FIG. 6 is similar to the one illustrated in FIG. 2, except that the MOSFET 207 has been removed and replaced by a short. The rest phase in this configuration no longer utilizes an active clamp reset, but instead relies upon a resonance between the magnetizing inductance inherent in the transformer 113 and capacitor 249 combined with the capacitance of MOSFET 205. This is commonly referred to as resonant reset. In this configuration, the flux density in the core of the transformer 113 may not be protected against saturation during the reset phase, as there is no reset switch that can be turned off. However, saturation during the power transfer phase may still be prevented, as described above in connection with FIG. 2.

Figure 7:
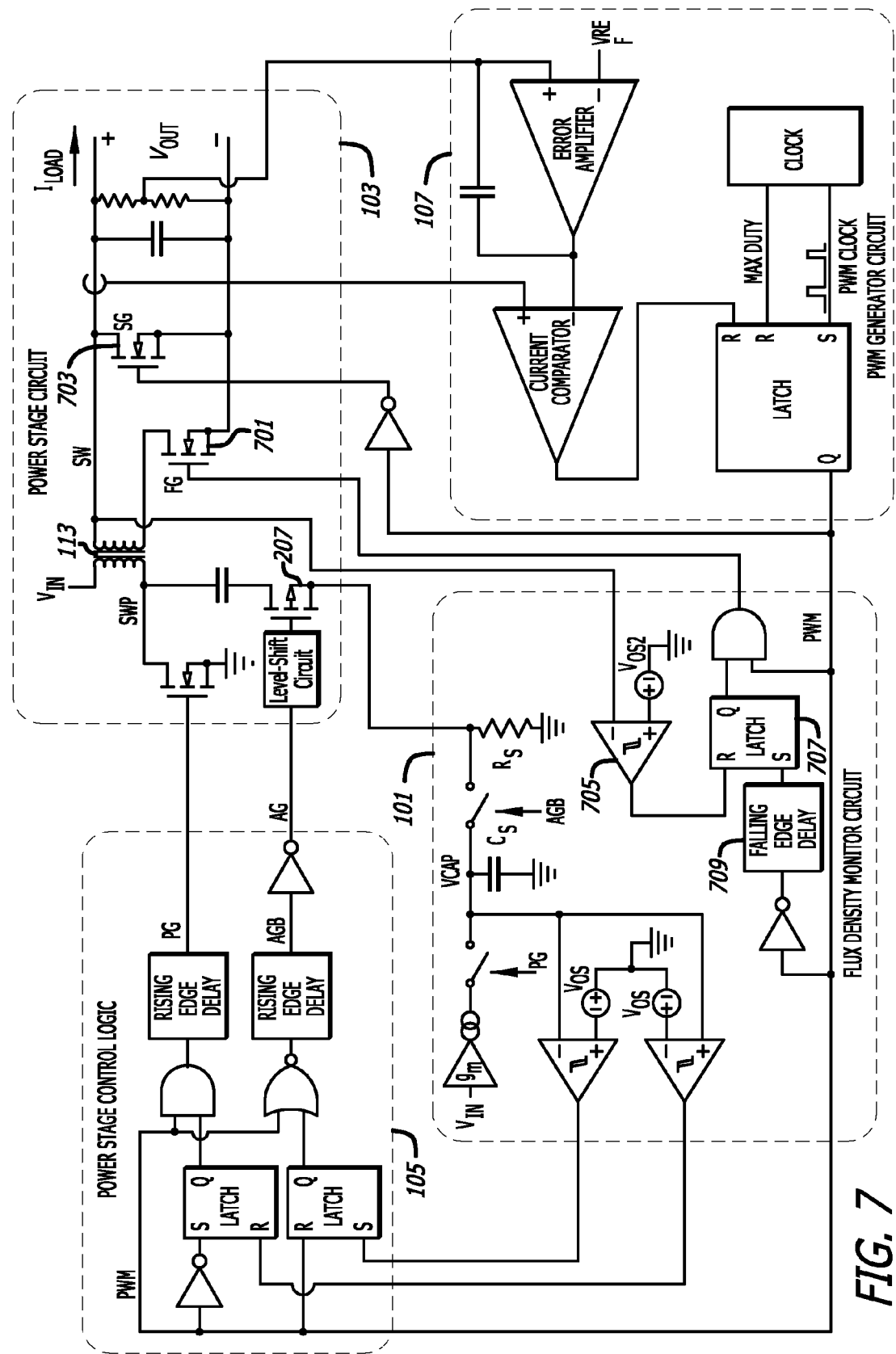
FIG. 7 illustrates an alternate embodiment of the circuit illustrated in FIG. 2 in which secondary side switches are used in lieu of diodes.

FIG. 7 illustrates an alternate embodiment of the circuit illustrated in FIG. 2 in which secondary side switches are used in lieu of diodes. As illustrated in FIG. 7, diodes in the illustration in FIG. 2 within the power stage circuit 103 have been replaced by MOSFETs 701 and 703 and associated control circuitry within the flux density monitor circuit 101 that causes them to function like the diodes that are illustrated in FIG. 2. This may result in higher efficiency. This control circuitry may cause MOSFET 701 to open when the flux density in the core of the transformer 113 reaches the pre-determined threshold, thus allowing the reset phase to begin. This is facilitated by a comparator 705 detecting a fall in the voltage on the secondary side switch node SW while PWM is high which, in turn, may reset a latch 707, turning off the MOSFET 701. A falling edge delay 709 may provide a "blanking" function for the comparator 705. It may keep the latch 707 set long enough to ensure that the switch node SW has had enough time to go high. Essentially, it may delay looking for SW to go low until after a time that SW should be high. This delay may be longer than the rising edge delay of PG combined with the delay through the transformer 113 and any other systemic delays.

Although not illustrated, the circuit in FIG. 7 may be modified to provide a resonant reset by eliminating the MOSFET 207, as illustrated in part in FIG. 6.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. A DC/DC converter comprising:
   a power stage circuit that includes an input, an output, and a transformer with a core, the power stage circuit being configured to operate in a power transfer phase during which power is transferred from the input to the output and a reset phase during which flux density in the core of the transformer is reduced;
   a pulse generator circuit configured to generate pulses that regulate the output of the power stage circuit;
   a flux density monitor circuit configured to:
      generate flux density information indicative of the flux density of the core of the transformer during both the power transfer phase and the reset phase;
      preserve a representation of the flux density in the core of the transformer at the end of the reset phase; and
      modify the preserved representation of the flux density in the core of the transformer to track changes in the flux density in the core of the transformer during the power transfer phase; and
   power stage control logic configured to regulate the output of the power stage circuit based on the pulses and to prevent the core of the transformer from saturating based on the flux density information, including to terminate the power transfer phase when the representation of the flux density in the core of the transformer reaches or exceeds a pre-determined threshold.

2. The DC/DC converter of claim 1 wherein the flux density monitor circuit includes a capacitance and is configured to cause a voltage across the capacitance to track changes in the flux density of the core of the transformer during both the power transfer phase and the reset phase.

3. The DC/DC converter of claim 1 wherein the power stage control logic is configured to prevent the core from saturating during the flux reset phase by causing the flux reset phase to terminate when the flux density information indicates that the flux density has reached or exceeded a pre-determined threshold.

4. The DC/DC converter of claim 3 wherein the power stage control logic is configured to prevent the core from saturating during the power transfer phase by causing the power transfer phase to terminate when the flux density information indicates that the flux density has reached or exceeded a pre-determined threshold.

5. The DC/DC converter of claim 1 wherein the DC/DC converter is a forward converter.

6. The DC/DC converter of claim 5 wherein the pulse generator is configured to generate a maximum duty cycle pulse that terminates the power transfer phase when a duty cycle of the power transfer phase reaches or exceeds a pre-determined threshold.

7. The DC/DC converter of claim 5 wherein the pulse generator is configured to terminate the power transfer phase when current in the output of the power stage circuit reaches or exceeds a pre-determined amount.

8. The DC/DC converter of claim 5 wherein the pulses generated by the pulse generator circuit have a constant frequency.

9. The DC/DC converter of claim 5 wherein the power stage circuit is configured to provide an active clamp reset.

10. The DC/DC converter of claim 9 wherein the active clamp reset causes the flux density to reverse in polarity during the reset phase.

11. The DC/DC converter of claim 5 wherein the power stage circuit is configured to provide a resonant reset.

12. The DC/DC converter of claim 5 wherein the power stage circuit includes switches on a secondary side of the transformer in lieu of diodes.

13. The DC/DC converter of claim 12 wherein the transformer has an output appearing at a switch node and the pulse generator circuit generates a pulse-width modulated signal and wherein the switches are controlled so as to be turned off during the power transfer phase if the switch node falls before the pulse-width modulated signal falls, thereby allowing the core of the transformer to begin to reset.

14. The DC/DC converter of claim 1 wherein the flux density monitor circuit includes a capacitance and is configured to cause a voltage across the capacitance to track changes in the flux density of the core of the transformer during the reset phase.

15. The DC/DC converter of claim 1 wherein the flux density monitor circuit includes a capacitance and is configured to cause a voltage across the capacitance to track changes in the flux density of the core of the transformer during the power transfer phase.

16. Circuitry for use in a DC/DC converter that has a power stage circuit that includes an input, an output, and a transformer with a core, and that is configured to operate in a power transfer phase during which power is transferred from the input to the output and a reset phase during which flux density in the core of the transformer is reduced, and a pulse generator circuit configured to generate pulses that regulate the output of the power stage, the circuitry comprising:
  a flux density monitor circuit configured to:
    generate flux density information indicative of the flux density of the core of the transformer during both the power transfer phase and the reset phase;
    preserve a representation of the flux density in the core of the transformer at the end of the reset phase; and
    modify the preserved representation of the flux density in the core of the transformer to track changes in the flux density in the core of the transformer during the power transfer phase; and
  power stage control logic configured to regulate the output of the power stage circuit based on the pulses and to prevent the core of the transformer from saturating based on the flux density information, including to terminate the power transfer phase when the representation of the flux density in the core of the transformer reaches or exceeds a pre-determined threshold.

17. The circuitry of claim 16 wherein the flux density monitor circuit includes a capacitance and is configured to cause a voltage across the capacitance to track changes in the flux density of the core of the transformer during both the power transfer phase and the reset phase.

18. The circuitry of claim 16 wherein the power stage control logic is configured to prevent the core from saturating:
  during the flux reset phase by causing the flux reset phase to terminate when the flux density information indicates that the flux density has reached or exceeded a pre-determined threshold; and
  during the power transfer phase by causing the power transfer phase to terminate when the flux density information indicates that the flux density has reached or exceeded a pre-determined threshold.

19. A DC/DC converter comprising:
  a power stage circuit that includes an input, an output, and a transformer with a core, the power stage circuit being configured to operate in a power transfer phase during which power is transferred from the input to the output and a reset phase during which flux density in the core of the transformer is reduced;
  a pulse generator circuit configured to generate pulses that regulate the output of the power stage circuit;
  a flux density monitor circuit configured to generate flux density information indicative of the flux density of the core of the transformer during both the power transfer phase and the reset phase; and
  power stage control logic configured to regulate the output of the power stage circuit based on the pulses and to prevent the core of the transformer from saturating based on the flux density information,
  wherein the DC/DC converter is a forward converter, and wherein:
    the pulse generator is configured to generate a maximum duty cycle pulse that terminates the power transfer phase when a duty cycle of the power transfer phase reaches or exceeds a pre-determined threshold; or
    the pulse generator is configured to terminate the power transfer phase when current in the output of the power stage circuit reaches or exceeds a pre-determined amount.

20. The DC/DC converter of claim 19 wherein the pulse generator is configured to generate a maximum duty cycle pulse that terminates the power transfer phase when a duty cycle of the power transfer phase reaches or exceeds a pre-determined threshold.

21. The DC/DC converter of claim 19 wherein the pulse generator is configured to terminate the power transfer phase when current in the output of the power stage circuit reaches or exceeds a pre-determined amount.

* * * * *